US011372487B2

(12) United States Patent
Lee et al.

(10) Patent No.: US 11,372,487 B2
(45) Date of Patent: *Jun. 28, 2022

(54) DISPLAY DEVICE WITH TOUCH ELECTRODES AND A TOUCH DRIVER PROVIDING A SIGNAL FOR DECREASING CAPACITANCE TO A DISPLAY DRIVER

(71) Applicant: LG Display Co., Ltd., Seoul (KR)

(72) Inventors: Junghan Lee, Paju-si (KR); Sungchul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,401

(22) Filed: Dec. 26, 2020

(65) Prior Publication Data
US 2021/0117021 A1 Apr. 22, 2021

Related U.S. Application Data

(63) Continuation of application No. 15/158,451, filed on May 18, 2016, now Pat. No. 10,908,743, which is a
(Continued)

(30) Foreign Application Priority Data

May 30, 2012 (KR) ........................ 10-2012-0057525

(51) Int. Cl.
*G06F 3/041* (2006.01)
*G06F 3/044* (2006.01)
*G09G 3/36* (2006.01)

(52) U.S. Cl.
CPC .............. *G06F 3/041* (2013.01); *G06F 3/044* (2013.01); *G06F 3/0412* (2013.01);
(Continued)

(58) Field of Classification Search
CPC ...... G06F 3/041; G06F 3/0412; G06F 3/0416; G06F 3/04164; G06F 3/04166;
(Continued)

(56) References Cited

U.S. PATENT DOCUMENTS 8,537,126 B2  9/2013  Yousefpour et al.
8,717,508 B2  5/2014  Yu et al.
(Continued)

FOREIGN PATENT DOCUMENTS

CN    101776973 A    7/2010
CN    101893777 A    11/2010
(Continued)

OTHER PUBLICATIONS

Office Action dated Jul. 19, 2018 from the State Intellectual Property Office of China in the corresponding Chinese divisional patent application No. 201610394285.0. (Translation submitted in parent application).

(Continued)

*Primary Examiner* — Keith L Crawley
(74) *Attorney, Agent, or Firm* — Morgan, Lewis & Bockius LLP

(57) ABSTRACT

A display device with an integrated touch screen including a display panel including electrodes divided into a plurality of block type groups and a plurality of data lines; a display driver IC configured to apply a common voltage to the electrodes when a driving mode of the panel is a display driving mode, sequentially apply a touch scan signal to each block type group when the driving mode of the panel is a touch driving mode, and apply a data signal to the data lines associated with a corresponding block type group when the touch scan signal is applied to the corresponding block type
(Continued)

group; and a touch IC configured to generate the touch scan signal and apply the touch scan signal to the display driver IC.

20 Claims, 3 Drawing Sheets

Related U.S. Application Data continuation of application No. 15/093,672, filed on Apr. 7, 2016, now Pat. No. 10,416,817, which is a continuation of application No. 14/954,859, filed on Nov. 30, 2015, now Pat. No. 10,416,816, which is a continuation of application No. 14/724,728, filed on May 28, 2015, now Pat. No. 9,229,599, which is a continuation of application No. 13/714,083, filed on Dec. 13, 2012, now Pat. No. 9,229,589.

(52) U.S. Cl.
CPC .......... *G06F 3/0416* (2013.01); *G06F 3/0418* (2013.01); *G06F 3/04166* (2019.05); *G06F 3/04184* (2019.05); *G09G 3/36* (2013.01); *G09G 3/3674* (2013.01); *G09G 3/3677* (2013.01); *G09G 3/3685* (2013.01); *G09G 3/3688* (2013.01); *G09G 3/3696* (2013.01); *G06F 2203/04101* (2013.01); *G09G 2310/0272* (2013.01); *G09G 2310/0278* (2013.01)

(58) Field of Classification Search
CPC .... G06F 3/0418; G06F 3/04184; G06F 3/044; G06F 2203/04101; G06F 2203/04107; G09G 3/36; G09G 3/3655; G09G 3/3666; G09G 3/3674; G09G 3/3677; G09G 3/3685; G09G 3/3688; G09G 3/3696; G09G 2300/0426; G09G 2300/043; G09G 2310/0243; G09G 2310/0272; G09G 2310/0278; G02F 1/13338
See application file for complete search history.

(56) References Cited

U.S. PATENT DOCUMENTS

| | | | |
|---|---|---|---|
| 8,773,603 | B2 | 7/2014 | Park et al. |
| 8,933,351 | B2 | 1/2015 | Noguchi et al. |
| 9,019,215 | B2 | 4/2015 | Hwang et al. |
| 9,035,202 | B2 | 5/2015 | Mizuhashi et al. |
| 9,035,900 | B2 | 5/2015 | Azumi et al. |
| 9,229,589 | B2 | 1/2016 | Lee et al. |
| 9,229,599 | B2 | 1/2016 | Lee et al. |
| 9,298,294 | B2 | 3/2016 | Takeuchi et al. |
| 9,671,905 | B2 | 6/2017 | Noguchi et al. |
| 10,908,743 | B2 * | 2/2021 | Lee ...................... G09G 3/3688 |
| 2006/0109222 | A1 | 5/2006 | Lee et al. |
| 2008/0129898 | A1 | 6/2008 | Moon |
| 2008/0309627 | A1 | 12/2008 | Hotelling et al. |
| 2009/0015562 | A1 | 1/2009 | Yasukawa |
| 2009/0289919 | A1 | 11/2009 | Jung et al. |
| 2010/0194697 | A1 | 8/2010 | Hotelling et al. |
| 2010/0194707 | A1 | 8/2010 | Hotelling et al. |
| 2010/0253638 | A1 | 10/2010 | Yousefpor et al. |
| 2010/0283760 | A1 | 11/2010 | Leung et al. |
| 2010/0295804 | A1 | 11/2010 | Takeuchi et al. |
| 2011/0102360 | A1 | 5/2011 | Chen et al. |
| 2011/0169759 | A1 * | 7/2011 | Wang ...................... G06F 3/041 345/173 |
| 2011/0175846 | A1 | 7/2011 | Wang et al. |
| 2011/0242050 | A1 | 10/2011 | Byun et al. |
| 2011/0267293 | A1 * | 11/2011 | Noguchi ............. G06F 3/04164 345/173 |
| 2011/0267295 | A1 | 11/2011 | Noguchi et al. |
| 2012/0044166 | A1 | 2/2012 | Mizuhashi et al. |
| 2012/0044195 | A1 | 2/2012 | Nakanishi et al. |
| 2012/0050217 | A1 | 3/2012 | Noguchi et al. |
| 2012/0056834 | A1 | 3/2012 | Kim et al. |
| 2012/0056835 | A1 | 3/2012 | Choo et al. |
| 2012/0068961 | A1 | 3/2012 | Mizuhashi et al. |
| 2012/0075239 | A1 | 3/2012 | Azumi et al. |
| 2012/0086654 | A1 | 4/2012 | Song |
| 2012/0086879 | A1 | 4/2012 | Yu et al. |
| 2012/0105337 | A1 | 5/2012 | Jun et al. |
| 2012/0113339 | A1 | 5/2012 | Park et al. |
| 2012/0162088 | A1 | 6/2012 | Van Lieshout et al. |
| 2012/0268423 | A1 | 10/2012 | Hotelling et al. |
| 2012/0287081 | A1 | 11/2012 | Akai et al. |
| 2013/0057511 | A1 | 3/2013 | Shepelev et al. |
| 2013/0147724 | A1 | 6/2013 | Hwang et al. |
| 2013/0176276 | A1 | 7/2013 | Shepelev |
| 2013/0285973 | A1 | 10/2013 | Elias et al. |
| 2015/0070314 | A1 | 3/2015 | Noguchi et al. |

FOREIGN PATENT DOCUMENTS

| | | |
|---|---|---|
| CN | 102109690 A | 6/2011 |
| CN | 102236487 A | 11/2011 |
| CN | 102375607 A | 3/2012 |
| CN | 102375639 A | 3/2012 |
| CN | 102419669 | 4/2012 |
| CN | 102419669 A | 4/2012 |
| CN | 102439548 A | 5/2012 |
| CN | 102445780 A | 5/2012 |
| CN | 102455538 A | 5/2012 |

OTHER PUBLICATIONS

Office Action dated Jul. 19, 2018 from the State Intellectual Property Office of China in the corresponding Chinese divisional patent application No. 201610394555.8. (Translation submitted in parent application).
Office Action for Chinese Patent Application No. CN 201210583979. 0, dated Oct. 10, 2015, 12 Pages.
Office Action for U.S. Appl. No. 13/714,083, dated Jul. 1, 2015, 14 Pages.
Office Action for U.S. Appl. No. 13/714,083, dated Dec. 15, 2014, 17 Pages.
Office Action for U.S. Appl. No. 13/714,083, dated Aug. 12, 2015, 13 Pages.
Office Action for U.S. Appl. No. 14/724,728, dated Jul. 16, 2015, 17 Pages.
Office Action for U.S. Appl. No. 14/724,728, dated Aug. 24, 2015, 15 Pages.
Office Action for U.S. Appl. No. 14/954,859, dated Feb. 24, 2016, 10 Pages.
Office Action for U.S. Appl. No. 15/093,672, dated Jun. 13, 2016, 18 Pages.
Office Action for U.S. Appl. No. 15/158,440, dated Aug. 22, 2016, 22 Pages.
Office Action for U.S. Appl. No. 14/954,859, dated Aug. 22, 2016, 20 Pages.
Office Action for U.S. Appl. No. 15/158,440, dated Dec. 20, 2016, 17 Pages.
Office Action for U.S. Appl. No. 14/954,859, dated Dec. 16, 2016, 15 Pages.
Office Action for U.S. Appl. No. 15/093,672, dated Dec. 16, 2016, 17 Pages.
Office Action for Chinese Patent Application No. CN 201510646521. 9, dated Oct. 11, 2017, 9 Pages (with English translation submitted in prior application).
Chinese Office Action dated Oct. 11, 2017 related to the corresponding Chinese divisional Patent application No. 201510646521.9 (Translation submitted in parent application).

* cited by examiner

US 11,372,487 B2

DISPLAY DEVICE WITH TOUCH ELECTRODES AND A TOUCH DRIVER PROVIDING A SIGNAL FOR DECREASING CAPACITANCE TO A DISPLAY DRIVER

CROSS-REFERENCE TO RELATED APPLICATIONS

This application is a continuation application under 35 U.S.C. § 120 of U.S. patent application Ser. No. 15/158,451 filed on May 18, 2016, which is a continuation application under 35 U.S.C. § 120 of U.S. patent application Ser. No. 15/093,672 filed on Apr. 7, 2016, now U.S. Pat. No. 10,416,817 issued on Sep. 17, 2019, which is a continuation application under 35 U.S.C. § 120 of U.S. patent application Ser. No. 14/954,859 filed on Nov. 30, 2015, now U.S. Pat. No. 10,416,816 issued on Sep. 17, 2019, which is a continuation application under 35 U.S.C. § 120 of U.S. patent application Ser. No. 14/724,728 filed on May 28, 2015, now U.S. Pat. No. 9,229,599 issued on Jan. 5, 2016, which is a continuation application under 35 U.S.C. § 120 of U.S. patent application Ser. No. 13/714,083 filed on Dec. 13, 2012, now U.S. Pat. No. 9,229,589 issued on Jan. 5, 2016, which claims the benefit of the Korean Patent Application No. 10-2012-0057525 filed on May 30, 2012, all of which are hereby incorporated by reference as if fully set forth herein.

BACKGROUND OF THE INVENTION

Field of the Invention

The present invention relates to a display device, and more particularly to a display device with an integrated touch screen.

Discussion of the Related Art

A touch screen is an input device included in image display devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by applying a pressure (i.e., pressing or touching) to a touch sensor of a touch screen. The demand of display devices with integrated touch screens such as smart phones and tablet Personal Computers (PCs) is increasing.

Hereinafter, a related art display device with an integrated in-cell type touch screen will be described with reference to FIG. 1. In particular, FIG. 1 is a diagram illustrating a related art display device with an integrated self-capacitive touch screen having an in-cell type.

As shown, the related art display device includes a panel 10 with a plurality of built-in electrodes 12, a display driver IC (DD-IC) 20 connected to an external system and controlling a plurality of data lines 13 inside the panel 10, and a touch IC 30 that drives the electrodes 12 inside the panel 10. Further, the panel 10 is alternately driven in a display driving mode and a touch driving mode, and thereby performs a touch function and a display function.

When the driving mode of the panel 10 is the display driving mode, the electrodes 12 receive a common voltage through a connection line 23 to act as a plurality of common electrodes for display driving, and the data lines 13 receive a floating voltage or a ground voltage from the display driver IC 20 for driving the liquid crystal display device.

Moreover, when the driving mode of the panel 10 is the touch driving mode, the electrodes 12 receive a touch scan signal through the connection line 23 to act as a plurality of touch electrodes. As shown in FIG. 1, the connection line 23 is connected to the electrodes 12.

Thus, in the related art display device, an initial capacitance is generated between a touch electrode and a data line, and the higher the initial capacitance, the lower the touch sensation. The reason is as follows.

A touch sensation corresponds to a size of a signal to noise ratio (SNR), which is a value obtained by dividing an average value of a signal (which is generated when a touch is not performed) and a signal (which is generated when a touch is performed) by the maximum value of noise caused when a touch is not performed. Therefore, the greater the noise, the less the size of an SNR, and thus the higher the initial capacitance and the lower the touch sensation. Further, the noise value is the initial capacitance value.

Hereinafter, an initial capacitance that lowers a touch sensation as described above will be described in detail with reference to FIG. 2. In particular, FIG. 2 is an enlarged diagram of a portion A of FIG. 1 illustrating the related art display device.

As illustrated in FIG. 2, an initial capacitance of 2.85 pF is formed between electrodes 12, and an initial capacitance of 1.6 pF is formed between data lines 13. Also, an initial capacitance of 98.5 pF is formed between an electrode 12 and a data line 13 that is formed not to overlap the electrodes 12, and an initial capacitance of 25.3 pF is formed between an electrode 12 and a data line 13 that is formed to overlap the lower portion of the electrode 12.

As shown in FIG. 2, an initial capacitance formed between an electrode 12 and a data line 13 is relatively greater than an initial capacitance formed between electrodes 12 or an initial capacitance formed between data lines 13. Therefore, an initial capacitance formed between an electrode 12 and a data line 13 causes relatively greater noise compared to an initial capacitance formed between electrodes 12 or an initial capacitance formed between data lines 13. Thus, a touch sensation is lowered.

Therefore, even though the floating voltage or the ground voltage is applied to a data line in the touch driving mode, a touch malfunction can occur when the floating voltage is applied to a data line in the touch driving mode, and an initial capacitance increases when the ground voltage is applied to a data line in the touch driving mode, causing an increase in noise. Further, a touch sensation and the accuracy of a touch are lowered due to an initial capacitance formed between an electrode and a data line.

SUMMARY OF THE INVENTION

Accordingly, one object of the present invention is to provide a display device with an integrated touch screen and method for driving the same that substantially obviate one or more problems due to limitations and disadvantages of the related art.

Another object of the present invention is to provide a display device with an integrated touch screen which minimizes the decrease in a touch sensation due to an initial capacitance generated between a data line and an electrode in a self-capacitive touch screen.

To achieve these and other advantages and in accordance with the purpose of the invention, as embodied and broadly described herein, the present invention provides in one aspect a display device with an integrated touch screen having a display panel including electrodes divided into a plurality of block type groups and a plurality of data lines; a display driver IC configured to apply a common voltage to the electrodes when a driving mode of the panel is a display driving mode, sequentially apply a touch scan signal to each block type group when the driving mode of the panel is a touch driving mode, and apply a data signal to the data lines associated with a corresponding block type group when the touch scan signal is applied to the corresponding block type group; and a touch IC configured to generate the touch scan signal and apply the touch scan signal to the display driver IC.

In another aspect, the present invention provides a method of controlling a display device with an integrated touch screen, and which includes dividing electrodes included in a display panel of the display device into a plurality of block type groups and a plurality of data lines; applying, via a display driver IC of the display device, a common voltage to the electrodes when a driving mode of the panel is a display driving mode; sequentially applying, via the display driver IC, a touch scan signal to each block type group when the driving mode of the panel is a touch driving mode, and applying a data signal to the data lines associated with a corresponding block type group when the touch scan signal is applied to the corresponding block type group; and generating, via a touch IC of the display device, the touch scan signal and apply the touch scan signal to the display driver IC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

In a display device with an integrated touch screen according to an embodiment of the present invention, a plurality of electrodes are divided into n number of groups, and a touch scan signal is sequentially applied to the n number of groups. For convenience, the following description assumes the electrodes are divided into three groups. However, the present invention is not limited to dividing the electrodes into the three groups, and the electrodes may be divided into four or more groups. Also, a connection line that connects a touch driver and a plurality of electrodes is formed to overlap between a data line and the electrodes, and is connected to the touch driver and the electrodes of a panel to apply a plurality of signals, applied from the touch driver, to the respective electrodes.

Figure 1:
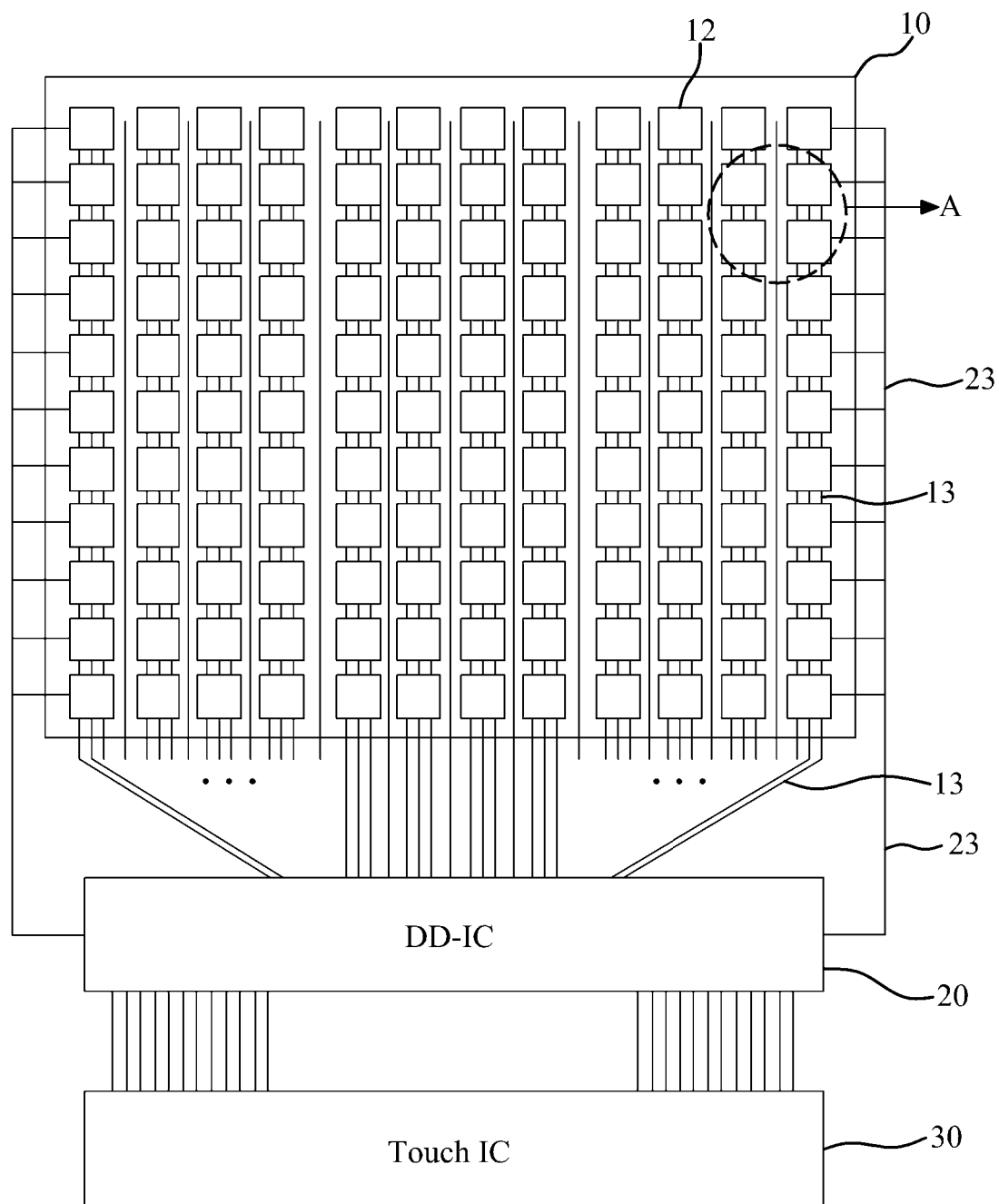
FIG. 1 is a diagram illustrating a related art display device with an integrated touch screen.
Figure 2:
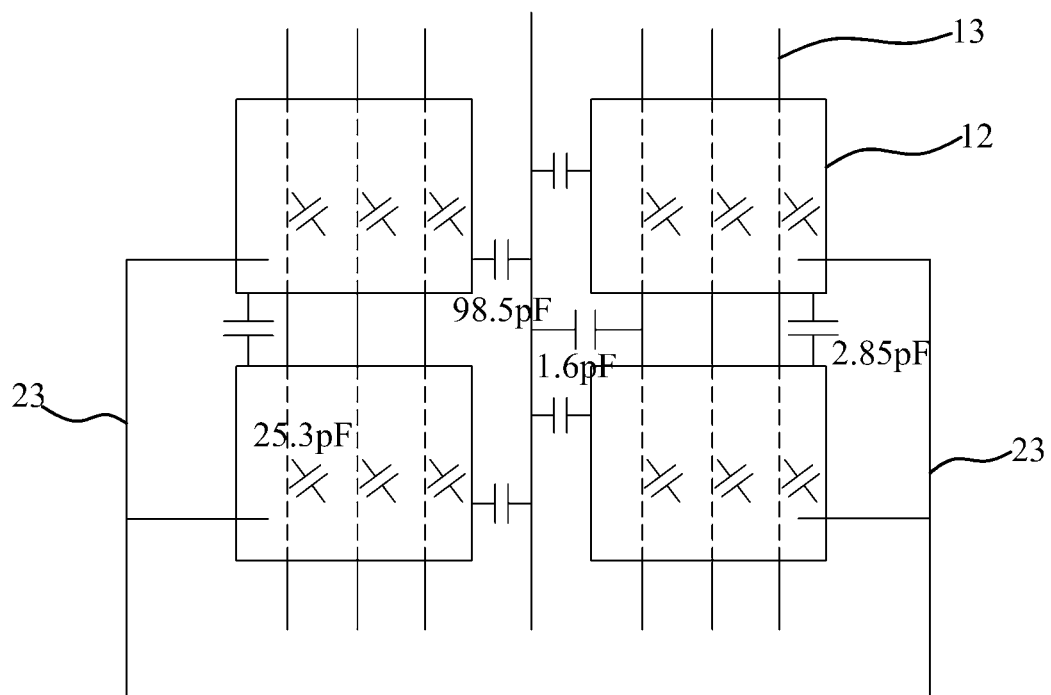
FIG. 2 is an enlarged diagram of a portion A of FIG. 1.
Figure 3:
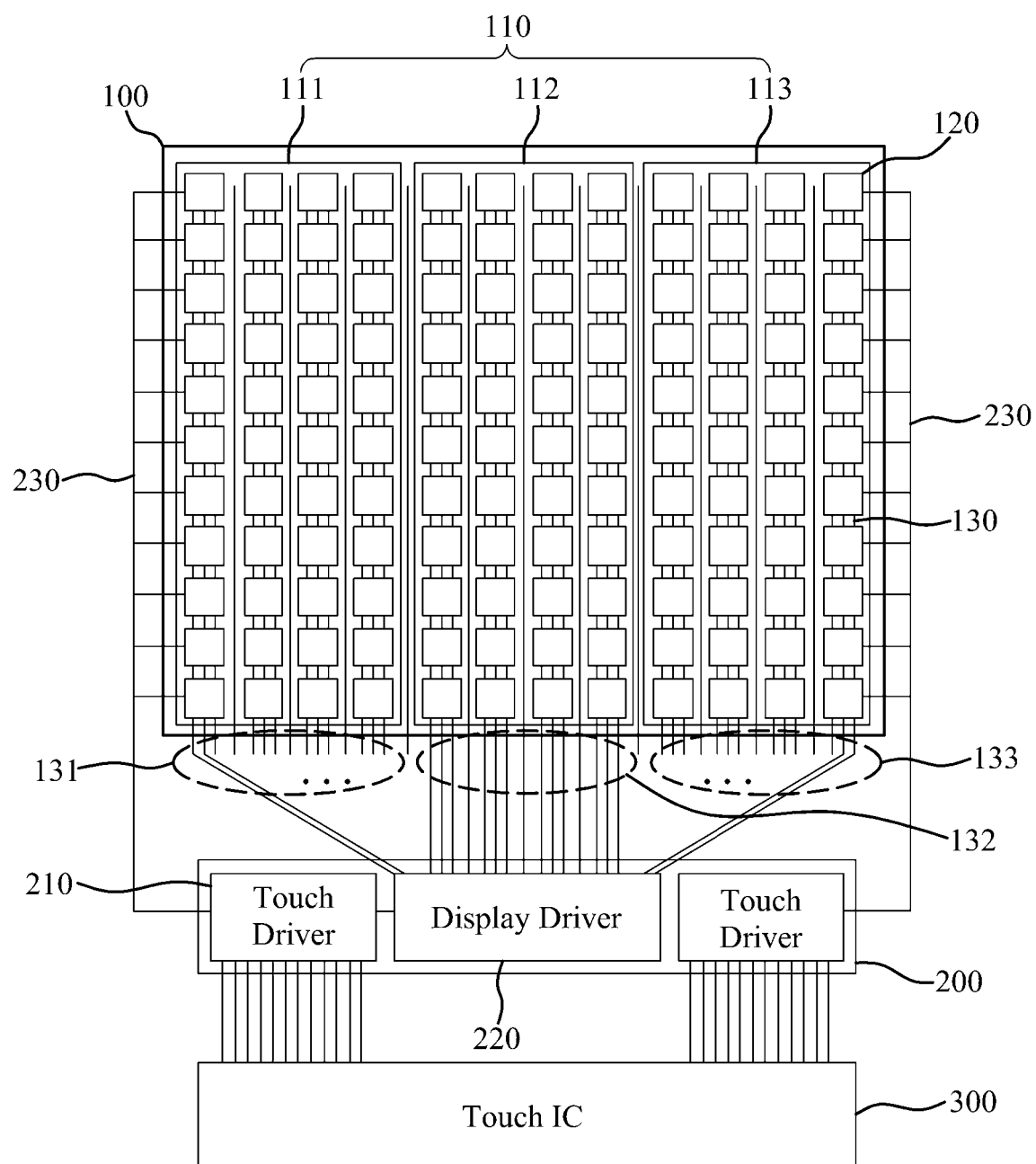
FIG. 3 is an overview illustrating a display device with integrated touch screen according to an embodiment of the present invention.

In more detail, FIG. 3 is a block diagram illustrating a display device with an integrated touch screen according to an embodiment of the present invention. As illustrated in FIG. 3, the display device includes a panel 100 having a plurality of electrodes 120 divided into a plurality of block type groups 110 and a plurality of data lines 130.

Also included is a display driver IC 200 that applies a common voltage to the electrodes 120 when the driving mode of the panel 100 is a display driving mode, applies a touch scan signal to each of the groups when the driving mode of the panel 100 is a touch driving mode, and applies a direct current (DC) voltage to the data lines 130, and a touch IC 300 that generates and applies the touch scan signal to the display driver IC 200.

Further, the panel 100 may include a liquid crystal layer formed between two substrates. In the panel 100, the plurality of data lines 130 and a plurality of gate lines intersect each other and a plurality of pixels are arranged in a matrix type by the intersection between the data lines 130 and the gate lines, thereby defining a plurality of pixel areas. In addition, each of the data lines 130 applies a data signal to a pixel to drive the liquid crystal panel, and may be formed under the electrodes 120.

Moreover, the groups 110 are block type groups. The block type groups 110 efficiently apply a data signal to only a data line that is formed under a group receiving the touch scan signal.

Thus, for the display driving mode, each of the electrodes 120 receives the common voltage from the display driver IC 200 to act as a common electrode. For the touch driving mode, each of the electrodes 120 acts as a touch electrode that senses a touched position with the touch scan signal applied from the touch IC 300. Also, the common voltage and the touch scan signal are applied to respective electrodes through a connection line 230.

In addition, even though the connection line 230 is illustrated as being connected to the electrodes 120 through both sides of the panel 100, the connection line 230 actually overlaps the data line 130. In other words, the connection line 230 overlaps the data line 130 between the electrode 120 and the data line 130, and is connected to the electrodes 120.

Further, the display driver IC 200 includes a touch driver 210 that applies the common voltage to the electrodes 120 or applies the touch scan signal by groups, and a display driver 220 that applies the DC voltage to the data lines 130.

In more detail, the display driver IC 200 includes the touch driver 210 that applies the common voltage, generated by a common voltage generator included in the display driver IC 200, to the electrodes 120 when the driving mode of the panel 100 is the display driving mode, and divides the electrodes 120 into three groups to sequentially apply the touch scan signal to the three groups when the driving mode of the panel 100 is the touch driving mode. Further, the display driver 220 applies the DC voltage to the data lines 130 formed under any one of the three groups receiving the touch scan signal.

For example, as illustrated in FIG. 3, when the touch scan signal for sensing a touched position is applied from the touch driver 210 to a first group 111 through the connection line 230, the DC voltage is applied from the display driver 220 to data lines 131 formed under the electrodes included in the first group 111. When the touch scan signal is applied to a second group 112, the DC voltage is applied to data lines 132 formed under electrodes included in the second group 112. Similarly, when the touch scan signal is applied to a third group 113, the DC voltage is applied to data lines 133 formed under electrodes included in the third group 113.

Thus, the DC voltage is applied to a data line formed under a group receiving the touch scan signal, which decreases an initial capacitance formed between an electrode in a group receiving the touch scan signal and a data line formed under electrodes included in the group, thus preventing the reduction in a touch sensation.

This is because a potential difference is generated between electrodes included in a group receiving the touch scan signal and a data line due to a driving voltage applied to the electrodes included in the group, which increases an initial capacitance that lowers a touch sensation. However, the potential difference between the electrodes and the data line is minimized by applying the DC voltage to the data line, causing the decrease in the initial capacitance.

The touch IC 300 applies the touch scan signal to the groups 110 through the touch driver 210 included in the display driver IC 200, and then senses the change in the capacitance of an electrode to determine whether the electrode is touched.

A method of driving the display device with an integrated touch screen according to an embodiment of the present invention will now be described in detail with reference to FIG. 3. In the display device with an integrated touch screen according to the present embodiment, the display driving and touch driving are temporally divided and performed according to the driving mode of the panel 100, and the display driver IC 200 generates a sync signal to differentiate the display driving mode and the touch driving mode.

When the driving mode of the panel 100 is the display driving mode, the common voltage generated by the common voltage generator included in the display driver IC 200 is applied simultaneously to the electrodes 120, and the DC voltage generated in the display driver IC 200 or applied from the outside to the display driver IC 200 is applied to the data line 130 through the display driver 220.

Subsequently, the electrodes 120 receive the common voltage from the display driver IC 200 through the connection line 230 to act as electrodes for the display driving of the panel 100, and a plurality of pixels receive the DC voltage for driving a digital logic thereof through the data line 130 to act as pixels for display driving.

However, when the driving mode of the panel 100 is the touch driving mode, three divided touch scan signals generated for touch sensing in the touch IC 300 are applied to the touch driver 210, and the DC voltage generated in the display driver IC 200 or applied from the outside to the display driver IC 200 is applied to the display driver 220.

Subsequently, the three divided touch scan signals applied to the touch driver 210 are applied to respective three groups 110 formed in the panel 100 through the connection line 230. For example, among the three divided touch scan signals, a first touch scan signal is applied to the first group 111 through the connection line 230, a second touch scan signal is applied to the second group 112, and a third touch scan signal is applied to the third group 113. Here, each of the first to third touch scan signals is sequentially applied to electrodes included in a corresponding group, for which a plurality of electrodes in each group are connected to the connection line 230.

Simultaneously, the DC voltage is sequentially applied from the display driver 220 to data lines formed under electrodes included in a group receiving the touch scan signal in the panel 100. For example, when the touch scan signal is applied from the touch driver 210 to the first group 111, the DC voltage is applied from the display driver 220 to the data lines 131 formed under electrodes included in the first group 111. When the touch scan signal is applied from the touch driver 210 to the second group 112, the DC voltage is applied to the data lines 132 formed under electrodes included in the second group 112. When the touch scan signal is applied from the touch driver 210 to the third group 113, the DC voltage is applied to the data lines 133 formed under electrodes included in the third group 113.

Subsequently, the electrodes 120 included in the groups 110 act as electrodes for touch driving that receive the touch scan signal from the touch driver 210 through the connection line 230 to detect a user's touch position, and transfers the touch position to the touch IC 300.

In an embodiment of the present invention, a plurality of data lines formed under the groups receiving the touch scan signal receive the DC voltage, and decrease an initial capacitance formed between an electrode in a group (which receives the touch scan signal) and a data line formed under in the group, thus preventing the reduction in a touch sensation.

In another embodiment of the present invention, the following description will be made in detail with again reference to FIG. 3 on a method that decreases an initial capacitance generated between an electrode in a group receiving a touch scan signal and a data line formed under the group.

A display device with an integrated touch screen according to another embodiment of the present invention includes the panel 100 with electrodes 120 that are divided into block type groups 110, and data lines 130. In addition, the display driver IC 200 applies a common voltage to the electrodes 120 when the driving mode of the panel 100 is a display driving mode, applies a touch scan signal to each of the groups when the driving mode of the panel 100 is a touch driving mode, and applies a data signal to the data lines 130. Also included is the touch IC 300 that generates and applies the touch scan signal to the display driver IC 200. Except the DC voltage generator, this other embodiment of the present invention is substantially the same as an embodiment of the present invention, and thus, a repetitive description is not provided. The following description is focused on the display driver IC 200.

The display driver IC 200 according to this other embodiment of the present invention includes the touch driver 210 that applies a common voltage to the groups 110 or applies a touch scan signal by groups, and the display driver 220 that applies a data signal to the data line 130. Here, the data signal applied to the data line 130 is a signal having the same phase as that of the touch scan signal.

Specifically, the display driver IC 200 according to another embodiment of the present invention includes the touch driver 210 that applies the common voltage, generated by a common voltage generator included in the display driver IC 200, to the electrodes 120 when the driving mode of the panel 100 is the display driving mode, and divides the electrodes 120 into three groups to sequentially apply the touch scan signal to the three groups when the driving mode of the panel 100 is the touch driving mode. Also included is the display driver 220 that applies the data signal having the same phase as that of the touch scan signal to the data lines 130 formed under any one of the three groups receiving the touch scan signal when the driving mode of the panel 100 is the touch driving mode.

For example, as illustrated in FIG. 3, when the touch scan signal for sensing a touched position is applied from the touch driver 210 to the first group 111 through the connection line 230, the data signal having the same phase as that of the touch scan signal is applied from the display driver 220 to the data lines 131 formed under the electrodes included in the first group 111. When the touch scan signal is applied to the second group 112, the data signal having the same phase as that of the touch scan signal is applied from the display driver 220 to the data lines 132 formed under the electrodes included in the second group 112. When the touch scan signal is applied to the third group 113, the data signal having the same phase as that of the touch scan signal is applied from the display driver 220 to the data lines 133 formed under the electrodes included in the third group 113.

In particular, a data signal applied to a data line under the electrodes included in a group receiving the touch scan signal may be a signal in which the touch scan signal applied from the touch IC 300 to the touch driver 220 is transferred to the display driver 210.

Here, the data signal having the same phase as that of the touch scan signal is applied to a data line formed under the electrodes included in a group receiving the touch scan signal, which decreases an initial capacitance formed between an electrode in a group receiving the touch scan signal and a data line formed under the group, thus preventing the reduction in a touch sensation.

As discussed above, this is because a potential difference is generated between electrodes included in a group receiving the touch scan signal and a data line due to the touch scan signal applied to the electrodes included in the group. However, the potential difference between the electrodes and the data line is minimized by applying the data signal having the same phase as that of the touch scan signal to the data line, thus causing the decrease in the initial capacitance.

A method of driving the display device with the integrated touch screen according to this other embodiment of the present invention will now be described in detail with reference to FIG. 3.

According to this embodiment of the present invention, when the driving mode of the panel 100 is the display driving mode, the common voltage generated by the common voltage generator included in the display driver IC 200 is applied simultaneously to the electrodes 120, and the electrodes 120 receive the common voltage from the display driver IC 200 to act as electrodes for display driving of the panel 100.

However, when the driving mode of the panel 100 is the touch driving mode, three divided touch scan signals generated for touch sensing in the touch IC 300 are applied to the touch driver 210, and a data signal generated in the display driver IC 200 is applied to the data line 130 through the display driver 220. Here, the data signal may be a signal that is generated by the touch driver 210 and applied to the display driver 220, and particularly, may be the touch scan signal.

Subsequently, the three divided touch scan signals applied to the touch driver 210 are applied to respective three groups 110 formed in the panel 100 through the connection line 230. For example, among the three divided touch scan signals, a first touch scan signal is applied to the first group 111 through the connection line 230, a second touch scan signal is applied to the second group 112, and a third touch scan signal is applied to the third group 113. Here, each of the first to third touch scan signals is sequentially applied to a plurality of electrodes included in a corresponding group. The plurality of electrodes in each group are also connected to the connection line 230.

Simultaneously, the data signal is sequentially applied from the display driver 220 to the data lines formed under the electrodes included in a group receiving the touch scan signal in the panel 100. Here, the data signals respectively applied to the data lines formed under the electrodes included in the group receiving the touch scan signal are signals having the same phase as that of the touch scan signal.

For example, when the touch scan signal is applied from the touch driver 210 to the first group 111, a plurality of data signals having the same phase as that of the touch scan signal are respectively applied from the display driver 220 to the data lines 131 formed under the electrodes included in the first group 111. When the touch scan signal is applied from the touch driver 210 to the second group 112, a plurality of data signals having the same phase as that of the touch scan signal are respectively applied to the data lines 132 formed under the electrodes included in the second group 112. When the touch scan signal is applied from the touch driver 210 to the third group 113, a plurality of data signals having the same phase as that of the touch scan signal are respectively applied to the data lines 133 formed under the electrodes included in the third group 113.

In another embodiment of the present invention, a plurality of data lines formed under the groups receiving the touch scan signal receive a plurality of data signals having the same phase as that of the touch scan signal, respectively, and decrease an initial capacitance formed between an electrode in a group receiving the touch scan signal and a data line formed under the electrodes included in in the group, thus preventing the reduction in a touch sensation.

This is because a potential difference is generated between a plurality of electrodes included in a group receiving the touch scan signal and a data line due to the touch scan signal applied to the electrodes included in the group. However, the potential difference between the electrodes and the data line is minimized by applying the data signal having the same phase as that of the touch scan signal to the data line, causing the decrease in the initial capacitance.

According to the embodiments of the present invention, in the self-capacitive touch screen, when a touch scan signal is applied to one group, by applying a DC voltage to a data line under electrodes included in the group receiving the touch scan signal, an initial capacitance between an electrode of the group and the lower data line of the group is minimized, thus enabling the more accurate sensing of a touch.

Moreover, according to the embodiments of the present invention, in the self-capacitive touch screen, when a touch scan signal is applied to one group, by applying a data signal having the same phase as that of a touch scan signal to a data line under electrodes included in the group receiving the touch scan signal, an initial capacitance between an electrode of the group and the lower data line of the group is minimized, thus enabling the more accurate sensing of a touch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A display device with touch electrodes, comprising:
a display panel including a plurality of touch electrodes for sensing a touch and a plurality of data lines for displaying an image on the display panel;

a driver circuit comprising a touch driver configured to drive at least one of the plurality of touch electrodes and a display driver configured to drive the plurality of data lines; and
a touch IC configured to generate a touch scan signal to sense a touched position with one of the plurality of touch electrodes, to generate a signal having a same phase as the touch scan signal, and to provide the touch scan signal and the signal having the same phase as the touch scan signal to the touch driver,
wherein the touch driver is configured to apply the touch scan signal to the one of the plurality of touch electrodes and to provide the signal having the same phase as the touch scan signal to the display driver; and
wherein the display driver is configured to apply the signal having the same phase as the touch scan signal from the touch driver to at least one of the plurality of data lines adjacent to the one of the plurality of touch electrodes.

2. The display device of claim 1, wherein the signal having the same phase as the touch scan signal is applied to the at least one of the plurality of data lines adjacent to the one of the plurality of touch electrodes without providing the signal having the same phase as the touch scan signal to another of the plurality of data lines not adjacent to the one of the plurality of touch electrodes, concurrently with the touch scan signal being applied to the one of the plurality of touch electrodes.

3. The display device of claim 2, wherein the plurality of touch electrodes are grouped into a plurality of touch electrode groups,
wherein the one of the plurality of touch electrodes is in one of the plurality of touch electrode groups, and
wherein another of the plurality of touch electrodes adjacent to the another of the plurality of data lines is in another of the plurality of touch electrode groups.

4. The display device of claim 1, wherein the signal having the same phase as the touch scan signal is the touch scan signal itself.

5. The display device of claim 1, wherein the touch IC is configured to sense a change in a capacitance of the plurality of touch electrodes for determining the touched position.

6. The display device of claim 1, wherein the touch IC is configured to sense a change in self-capacitance of the one of the plurality of touch electrodes to which the touch scan signal is applied.

7. The display device of claim 1, wherein the signal having the same phase as the touch scan signal is a DC voltage signal having the same phase as the touch scan signal.

8. The display device of claim 1, wherein the touch driver is configured to apply a first display signal to at least one of the plurality of touch electrodes for displaying the image on the display panel, and
wherein the display driver is configured to apply a second display signal to at least one of the plurality of data lines.

9. The display device of claim 1, wherein the signal having the same phase as the touch scan signal is a data signal having the same phase as the touch scan signal.

10. The display device of claim 1, wherein the touch driver is configured to apply the touch scan signal to the one of the plurality of touch electrodes without applying the touch scan signal via the display driver.

11. A display device with touch electrodes, comprising:
a display panel including a plurality of touch electrodes for sensing a touch, a plurality of data lines for displaying an image on the display panel, and a capacitance between at least one of the plurality of data lines and at least one of the plurality of touch electrodes;
a driver circuit comprising a touch driver configured to drive the plurality of touch electrodes and a display driver configured to drive the plurality of data lines; and
a touch IC configured to generate a touch scan signal to sense a touched position with one of the plurality of touch electrodes, to generate a signal for decreasing the capacitance based on the touch scan signal, and to provide the touch scan signal and the signal for decreasing the capacitance to the touch driver,
wherein the touch driver is configured to apply the touch scan signal to the one of the plurality of touch electrodes and to provide the signal for decreasing the capacitance to the display driver; and
wherein the display driver is configured to apply the signal for decreasing the capacitance from the touch driver to at least one of the plurality of data lines.

12. The display device of claim 11, wherein the touch driver is configured to apply the touch scan signal sequentially to each of the plurality of touch electrodes without applying the touch scan signal via the display driver, and
wherein the signal for decreasing the capacitance has a same phase as the touch scan signal.

13. The display device of claim 12, wherein the signal having the same phase as the touch scan signal is a DC voltage signal having the same phase as the touch scan signal.

14. The display device of claim 12, wherein the signal having the same phase as the touch scan signal is the touch scan signal itself.

15. The display device of claim 12, wherein the plurality of touch electrodes are grouped into a plurality of touch electrode groups,
wherein the touch driver is configured to apply the touch scan signal sequentially to each of the plurality of touch electrode groups, and
wherein the touch IC is configured to sense a change in self-capacitance of the touch electrodes of the touch electrode groups.

16. The display device of claim 11, wherein the touch driver is configured to apply the touch scan signal to the one of the plurality of touch electrodes to sense a touched position with the one of the plurality of touch electrodes; and
wherein the display driver is configured to apply the signal for decreasing the capacitance to one of the plurality of data lines adjacent to the one of the plurality of touch electrodes.

17. The display device of claim 16, wherein the signal for decreasing the capacitance is applied to the one of the plurality of data lines adjacent to the one of the plurality of touch electrodes without providing the signal to another of the plurality of data lines not adjacent to the one of the plurality of touch electrodes, concurrently with the touch scan signal being applied to the one of the plurality of touch electrodes.

18. The display device of claim 17, wherein the plurality of touch electrodes are grouped into a plurality of touch electrode groups,
wherein the one of the touch electrodes is in one of the touch electrode groups, and
wherein another of the plurality of touch electrodes adjacent to the another of the plurality of data lines is in another of the touch electrode groups.

19. The display device of claim 11, wherein the touch driver is configured to apply a first display signal to at least one of the plurality of touch electrodes for displaying the image on the display panel, and wherein the display driver is configured to apply a second display signal to at least one of the plurality of data lines.

20. The display device of claim 12, wherein the signal having the same phase as the touch scan signal is a data signal having the same phase as the touch scan signal and applied to the data lines.

* * * * *